Oct. 9, 1962     J. H. FORKNER     3,057,739

METHOD FOR DEHYDRATING FOOD PRODUCTS

Filed March 7, 1960     2 Sheets-Sheet 1

INVENTOR.
JOHN H. FORKNER
BY
ATTORNEYS

Oct. 9, 1962      J. H. FORKNER      3,057,739
METHOD FOR DEHYDRATING FOOD PRODUCTS
Filed March 7, 1960      2 Sheets-Sheet 2

INVENTOR.
JOHN H. FORKNER
BY
ATTORNEYS

United States Patent Office 3,057,739
Patented Oct. 9, 1962

3,057,739
METHOD FOR DEHYDRATING FOOD PRODUCTS
John H. Forkner, Fresno, Calif., assignor to The Pillsbury Company, Minneapolis, Minn., a corporation of Delaware
Filed Mar. 7, 1960, Ser. No. 13,113
12 Claims. (Cl. 99—204)

This invention relates generally to methods for dehydrating or drying various moist food products, including such materials as fruits, vegetables, meats, fish, synthetic moist edible materials, and moist formulated mixtures.

Many moist food products normally in solid or semisolid form are dehydrated commercially for preservation and weight economy. For example, so-called dried fruit (e.g., apple, peach, pear or apricot) is processed by placing prepared pieces on trays, and subjecting the trays to sun drying, or to a hot drying atmosphere in a dehydrator. Such processing seriously affects various heat sensitive and oxidizable constituents of the fruit, thus forming products of poor quality, which have greatly modified characteristics (e.g., flavor, color, nutrative value, etc.). The impairment occurs largely in the final stages of drying, presumably because the greater moisture content during the first part of drying protects the product against serious injury. Dehydrated products of better quality can be obtained by applying vacuum drying, because of the lower temperatures employed. Vacuum dehydrators such as have been used commercially are provided with heated shelves or conveyers upon which metal drying trays are supported. The shelf temperature may range from about 140 to 220° F. and partial vacuums may be applied ranging inversely from about 28 to 22 inches mercury column. With such equipment, many fruits, vegetables and meats can be dehydrated without serious impairment of heat sensitive or oxidizable constituents. However, conventional vacuum dehydration has certain recognized disadvantages, which detract from or prevent commercial application. Particularly, the heat transfer to the mass of material undergoing dehydration is relatively inefficient, because it is confined largely to the surfaces in contact with the bottom of the tray, and contact of the heated atmosphere with the exterior surfaces of the mass. Use of radiant heat may promote heat transfer, but tends to cause surface burning and case hardening. Poor heat transfer necessarily interferes with effective and efficient evaporation of moisture, and it tends to cause overheating and burning of surfaces in contact with the tray. With many food products, juices are evolved during the dehydrating process, and such juices contact the heated tray, thus causing sticking and accentuating the problem of cleaning the trays for subsequent use. Many food products are self-supporting at the commencement of a dehydrating operation, but during evaporation, due to heating, they tend to become softer with resulting sagging. Conventional vacuum dehydration just described does not provide any side support for such masses, with the result that an enlarged surface of the masses is brought into contact with the tray, thus increasing the area of possible overheating and sticking. In addition, a desired physical shape of the material may be destroyed.

In general it is an object of the present invention to provide a dehydrating method which largely avoids the difficulties of the prior methods described above.

Another object of the invention is to provide a dehydrating method which more effectively transfers heat to the masses undergoing dehydration, and which avoids sticking of the masses to the drying trays.

Another object of the invention is to provide a method of the above character which makes for greater increased heat transfer areas between the masses undergoing dehydration, and a surrounding nongaseous medium.

Another object of the invention is to provide a method of the above character which effectively accommodates extruding juices from the masses undergoing dehydration, without permitting such juices to contact the surface of the drying tray.

Another object of the invention is to provide a method of the above character which provides better support for soft masses undergoing dehydration, whereby the initial form of such masses is better retained throughout the method.

Another object of the invention is to provide novel dehydrated products resulting from the present method.

Referring to the drawing.

The present method is characterized by the use of a special expandable medium which performs certain important functions during evaporation of moisture from food product masses. More specifically, the expandable medium is associated with the food product masses from the beginning of the dehydrating operation and during dehydration, during which time the food product is subjected to reduced pressure and elevated temperature conditions to effect evaporations of moisture, and concomitantly the medium is caused to expand to provide a greatly increased area of contact with the exterior surfaces of the masses, whereby during a substantial or major part of the drying operation, the expanded medium forms cellular means for effectively transferring heat by conduction to the masses. The expanded medium also provides a number of additional advantageous results, as will be presently explained.

Figure 1:
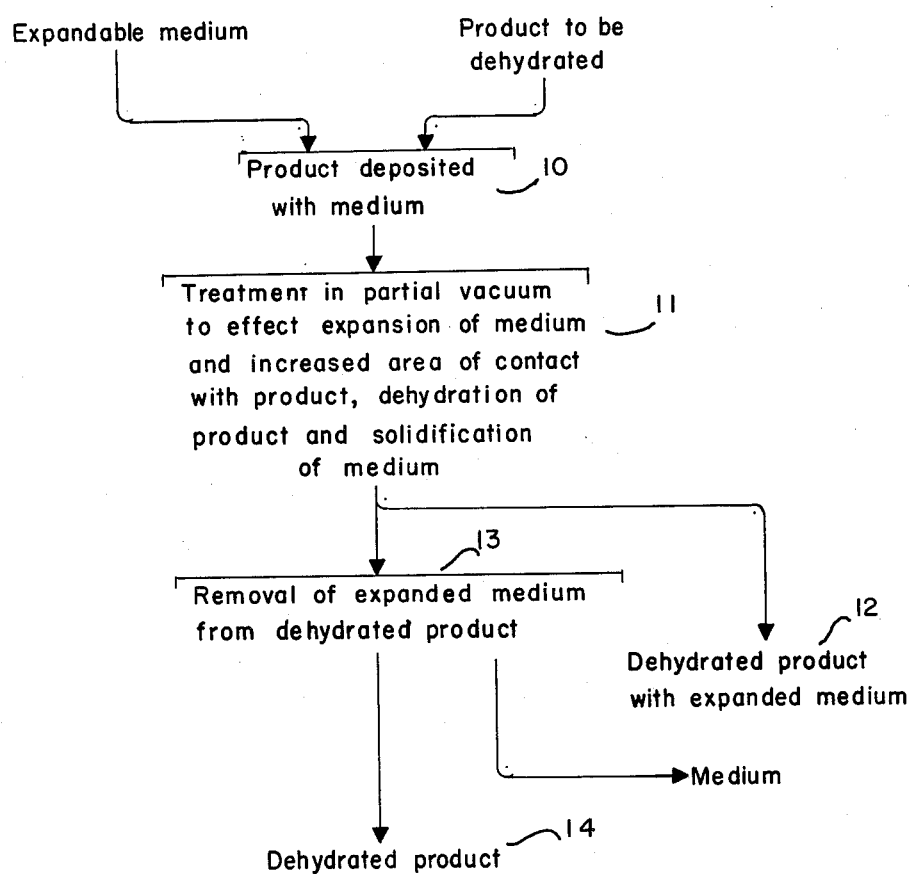
FIGURE 1 is a flow sheet illustrating one procedure for carrying out the present invention.
Figure 2:
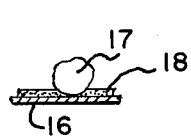
FIGURE 2 is a schematic view illustrating the product for step 10 of FIGURE 1.

FIGURE 1 illustrates one procedure for carrying out my method. Masses of the moist product to be dehydrated are supplied to step 10, together with the expandable medium. Assuming that both the product and the medium are introduced into drying trays, they are supported on the tray in intimate contact with each other, but at that time the masses are of such size, compared to the volume of medium present, that only a minor part of the surface of each mass may be in contact with the medium. As will be presently explained, in some instances the medium may be a fluid, but preferably, it is a comminuted solid material. Assuming that the medium is a fluid, the relationship between the food product masses and the fluid medium, may be as illustrated in FIGURE 2. Member 16 in this instance represents the metal bottom of a drying tray upon which the moist food product 17 is supported. The expandable fluid medium 18 covers the top surface of the tray, and as illustrated it may immerse only the lower portion of the food product mass 17.

In step 11, the food product together with the expandable medium, are treated in a partial vacuum and at an elevated temperature to effect expansion of the medium, with concomitant evaporation of moisture from the food product. Good results have been obtained by employing vacuums within the range of from 27–29 inches (28 preferred) mercury column, with the shelves being heated to from 140 to 220° F., whereby the product and the medium are heated to an elevated temperature of the order of 120–180° F.

Figure 3:
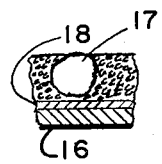
FIGURE 3 is a view like FIGURE 2, illustrating the product for step 11 of FIGURE 1.

FIGURE 3 illustrates the tray 16 being supported upon the heated shelf 17 of a vacuum dehydrator. The medium 18 has been expanded to form a sponge-like or cellular body which may substantially completely envelop the product mass 17. Particularly in partially dehydrated or predried products (e.g., predried peaches) expansion occurs during the initial phase of step 11, thus providing increased surface contact with the exterior surface of the product mass 17, with a lifting of this mass from the tray 16, well before dehydration of the mass has been completed. As will presently be explained in greater detail, heat transfer occurs by conduction from the tray bottom 16 to the expanded medium 18, and from this medium by conduction to the food masses 17 undergoing dehydration. Because the medium 18 is porous and sponge-like during a substantial final part of the step 11, evaporation of moisture from the exterior surfaces of the food masses 17 may occur directly into the sponge-like medium, as well as to the atmosphere exterior of this medium. In addition, juices which may extrude from the predried masses 17 are absorbed by the sponge-like medium, without causing sticking to the tray bottom 16. Another feature is that when imbedded in the expanded medium 18, as in FIGURE 3, the mass 17 is well supported on both its bottom and sides, thus tending to minimize sagging or other distortions in form which might otherwise occur. While being dehydrated, the expanded medium protects the product from exposure to radiant heat, which otherwise might cause surface burning. In general, somewhat higher shelf temperatures can be used with better drying efficiency, but without injury to the product.

In addition to the medium 18 being expanded well before the end of the dehydrating step 11, it is solidified as a solid porous mass when dehydration has been completed and the product together with such mass is readily separable from the tray.

The product removed from the dehydrating step 11, as indicated at 12, consists of the dehydrated food product largely surrounded and imbedded in the expanded medium. In some instances the product may be solid in this form, particularly where the expanded material is edible and is compatible with the dehydrated product. In many instances, however, it is desirable to remove a portion of the expanded and friable material from the dehydrated food product, as indicated in step 13. The medium thus removed may be employed for other purposes, and the dehydrated product 14 may be packaged in any one of several conventional ways, for distribution to the trade.

The product to be dehydrated and which is supplied to the step 10 may in many instances be subjected to preliminary or preparatory treatment. While whole items of vegetables and fruit may in some instances be dehydrated, in many instances it is more convenient to reduce the material to slices, cubes, or other fragments of more convenient size and form. Also, it is economical and convenient in many instances to subject the material to preliminary conventional drying (i.e., predrying), thus reducing the amount of free juices and providing masses which can be more conveniently handled in the steps of the present method. Such preliminary drying may be applied subsequent to certain preparatory operations such as slicing. If storage is desirable before applying my method, the product may be stored in frozen condition, either before or after other preparatory treatment. In fact, the product as introduced into the trays and at the start of step 10 may be frozen. Freezing can be employed to modify the cell structure of the product.

With respect to the expandable medium, good results have been secured by using a medium consisting mainly of a reducing sugar, such as glucose, dextrin and maltose. Varying amounts of maltose and other reducing sugars are supplied by using commercial corn sugar, corn syrup, malt syrup, glucose, or mixtures of the same. Commercial corn syrup contains from about 18 to 22% moisture, which largely evaporates during step 11. As will be presently explained, generally it is desirable to concentrate the syrup by preliminary evaporation. Minor amounts of other sugars can be used, such as sucrose, although the major portion of the sugar employed is of the type mentioned above.

While reducing sugar syrup can be used by itself as an expandable medium, it is desirable to provide small amounts of additives, particularly materials such as soluble casein or low methoxyl pectin which stabilize the medium by affording better control over the extent of expansion and time of solidification or setting. The casein can be added as a soluble caseinate (e.g., sodium caseinate), or as an alkaline solution of casein in water. Skim milk solids, with or without removal of a portion of its lactose content, can be used as a source of casein.

The volume expansion of the medium can be increased by mechanical beating or whipping to incorporate air or other gas into styrup. One or more whipping agents can be added to aid whipping and to stabilize the whipped syrup. Thus with addition of a small amount of a whipping agent into commercial corn syrup, such as egg white or other form of albumen, or a whipping agent such as shown in Patent 2,765,232, the syrup at room temperature can be beaten to form a stable whip containing a substantial amount of dispersed air.

As previously stated, commercial corn syrup such as referred to above normally has a moisture content of the order of from 18 to 22%. Depending upon the product being processed the syrup may be preconcentrated by evaporation. Assuming that the syrup medium has a moisture content less than that of the product (which is preferred) then during step 11 and before the syrup has solidified, some moisture from the food product is absorbed by the syrup, and some of the syrup sugar is absorbed by the product.

As will be explained in greater detail in conjunction with FIGURE 4, the expandable medium preferably has an initial moisture content substantially less than that of commercial corn syrup, as for example less than 10%. Also, I prefer that the medium be in the form of a divided material, consisting of solid fragments, instead of a fluid or semi-fluid syrup.

Assuming use of a stabilizer like casein, the medium on a dry solids base may contain from 94 to 98% of reducing sugar (e.g., corn sugar) and from 6 to 2% of casein. Where a whipping agent is used like albumin, without the stabilizer, the medium may contain from 95 to 97% reducing sugar (i.e., corn sugar) and from 3 to 5% of albumin. When both stabilizer and whipping agents are employed, the stabilizer can consist of from 94 to 96% reducing sugar (e.g., corn sugar), from 2 to 3% stabilizer (e.g., casein), and from 2 to 3% whipping agent (i.e., dried egg white).

As previously described, step 11 can conveniently be carried out by the use of commercial vacuum dehydrating equipment, provided with heated shelves upon which the trays are supported. Some difficulty may be experienced in maintaining a syrup layer of uniform depth, particularly when the trays are tilted or have bent bottoms. Use of a divided solid medium eliminates this difficulty because within reasonable limits a layer of uniform depth can be applied and maintained on tilted or uneven surfaces.

The manner in which the food product masses are deposited upon the trays, and the amount of expansible medium used in proportion to the volume of food masses present, will vary in different instances. For masses of substantial size, such as pieces of fruit, it is desirable to place a single layer of the masses upon the tray, without having the masses crowded into direct contact with each other. However, where smaller sized masses are to be dehydrated, such as green peas, the peas may be deposited two or three layers deep, with reliance upon the expandable medium to envelop all of the masses and to elevate and reorient the masses during dehydration, whereby they are largely separated from direct contact with each other and with the bottom of the tray. With a divided solid medium, the product can be deposited upon a layer of the medium or deposited with the medium as will be presently described.

Step 13 can be carried out by suitable means capable of mechanically disintegrating the sponge-like friable medium and evaporating it from the dry product. For example the material from step 13 can be subject to mechanical agitation, as by tumbling or vibration, to cause the friable medium to crumble and break away from the dry product, after which the product is removed by screening. Where the product is subject to injury by such treatment (e.g., peas, peppers, etc.), or where it may be unobjectionable or convenient to leave a substantial part of the medium attached to the products, all or part of the medium can be removed by dissolving in water, as for example as a step applied by the consumer preliminary to cooking.

Figure 4:
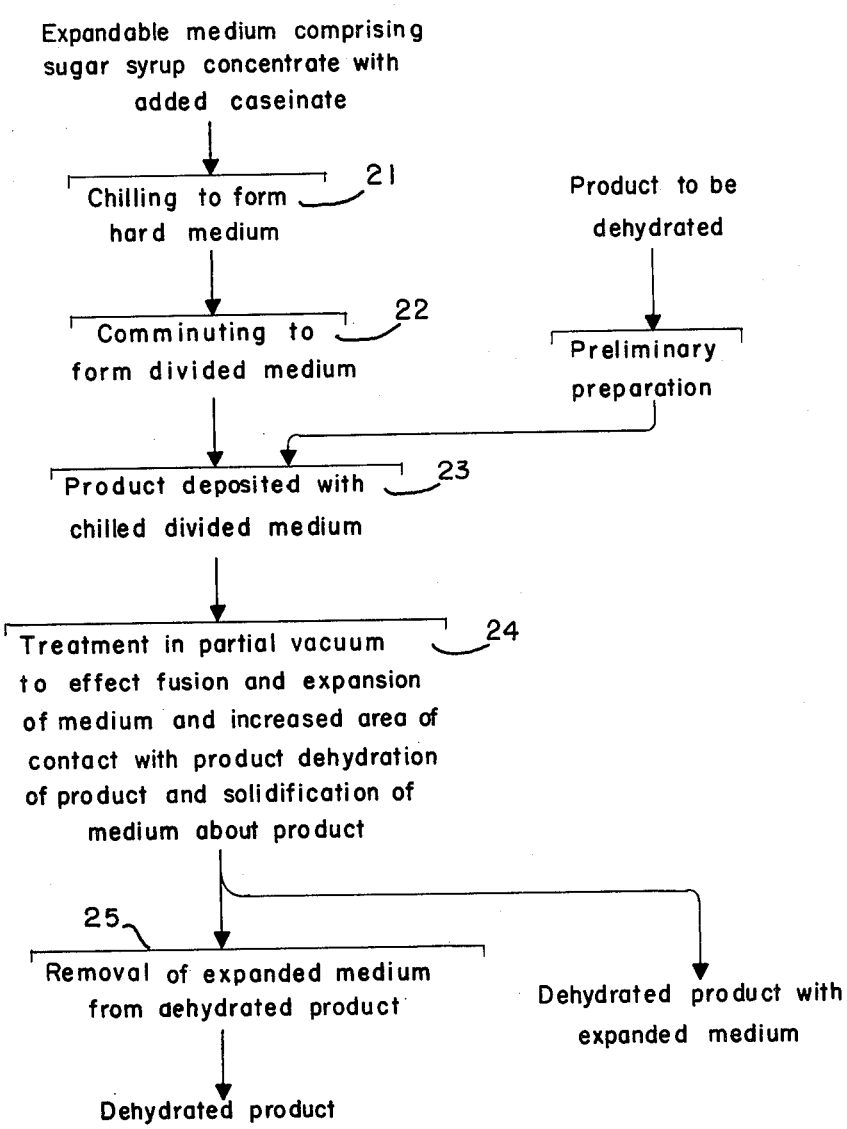
FIGURE 4 is a flow sheet illustrating a more elaborate procedure for carrying out the invention.

FIGURE 4 illustrates the preferred procedure which employs a medium that is a divided solid material, rather than a fluid. In this instance, the expandable medium used may be a concentrated reducing sugar syrup, such as corn syrup which has been concentrated by evaporation whereby it contains from say 2 to 10% moisture. Preferably while warm, small amounts of additives are introduced, such as a stabilizer like soluble casein. Also, I may add a whipping agent like egg white, and incorporate air by mechanical whipping.

In step 21, the concentrated material is formed into sheets and chilled to a temperature of the order of 60° F. or lower, whereby it is made hard or brittle. Sheets, slabs, bars or strips of this brittle material are comminuted in step 22, as by the use of a suitable disintegrating mill, to provide a divided mass consisting of hard fragments.

Figure 5:
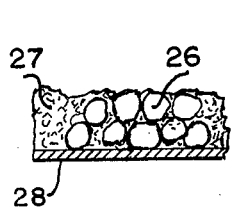
FIGURE 5 is a schematic view in section illustrating the process for step 23 of FIGURE 4.

In step 23 the food product to be dehydrated can be deposited upon a layer of the divided medium in a dehydrator tray or other suitable supporting surface. As shown in FIGURE 5, and assuming that the food product 26 to be dehydrated consists of masses of suitable size, such as green peas, the divided medium 27 may be intermixed with the peas and the mixed mass deposited upon the tray bottom 28. Also, it is possible to apply the medium in successive layers with the product being deposited therebetween. Instead of depositing in trays, the medium can be deposited on a belt conveyor of a vacuum dehydrator of the continuous type with the belt heated to say 150 to 200° F. Melting of the fragments in direct contact with the belt causes sufficient adherence to retain the layer without side confinement. The product can be deposited directly upon such a layer.

Figure 6:
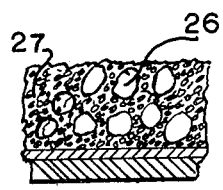
FIGURE 6 is a schematic view in section illustrating the product for step 24 of FIGURE 4.

Step 24 corresponds to step 11 of FIGURE 1. During this treatment the effect of temperature and reduced pressure causes the medium 27 to be fused and expanded into a porous and sponge-like mass as indicated in FIGURE 6, whereby this material substantially completely imbeds and surrounds the masses 26, and causes these masses to be reoriented and separated from direct contact with each other, and from the tray bottom 28. As described with reference to FIGURE 1, the expanded mass sets or solidifies to form a friable porous mass which performs the various functions during dehydration previously described with reference to FIGURE 1.

Use of a divided solid medium, with its low moisture content (e.g., 2 to 10%), facilitates control over expansion, thus avoiding excessive and uneven expansion. Excessive expansion may cause contact with the supporting shelves and heating elements for overlying trays, and this causes serious operating and maintenance problems. Thus with a concentrated medium the degree of expansion can be controlled within desired limits which permit use of vacuum dehydration in which the trays are carried between a plurality of vertically superposed heated shelves, without undesirable contacts between the expanded medium and portions of the shelves or heating elements. Also a low moisture content medium makes for a more uniform cell structure without large voids or pockets, whereby the presence of larger amounts of moisture makes for undesirable large cells or pores which are less able to raise and support the product being dehydrated. Also an expanded medium with relatively large air cells does not transmit heat to the product as effectively as a five cell medium.

The dehydrated product obtained by my method is of high quality with many characteristics serving to distinguish it from products obtained by conventional vacuum dehydration. The surfaces of the masses do not reveal overheated areas or spots, corresponding to areas produced by prior methods because of direct physical contact between the product and the bottoms of the trays, and by direct contacts between adjacent masses. Because substantially all exterior surfaces of the peas are covered by the expanded medium, there is substantially no surface oxidation or discolorization. The moisture content is relatively uniform throughout the masses, which is attributed to the fact that the heat exchange to the masses during dehydration is relatively uniform, and distributed over substantially the entire areas of the masses. The dehydrated masses have substantially the same form as the masses originally subjected to dehydration, due to the supporting effect of the expanded medium. Products like peas do not collapse during dehydration due to the absence of pressure from surrounding peas. Thus the normal cell structure is retained without collapsing, which makes for rapid rehydration. When juice has extruded from the masses during dehydration, such juice does not cause sticking on the bottom of the tray, since it has been retained by the expanded medium. Because of the characteristics just mentioned, the final dehydrated food product possesses all of the characteristics which are normally associated by the trade with a high quality product. In this connection we have reference particularly to good color, flavor, palatability, and unimpaired nutritive value, and to the retention of these characteristics, with minimum oxidation, during storage.

In most instances it is not objectionable for the final dehydrated product to have some of the expanded sugar medium remaining upon its outer surfaces. If desired, the product can be subjected to successive steaming stages with interposed agitation and air drying whereby surface sugar is liquefied and made to form a relatively invisible protective glaze or coating. At the conclusion of such treatment, the surfaces may be lightly coated with agents like powdered or granulated sucrose, or starch.

Examples of my method are as follows:

*Example 1*

Fresh peaches were cut into halves, pitted and peeled. By the use of a conventional dehydrator, they were dried to a moisture content of about 40%, by use of a drying atmosphere at 140° F., over a period of about 5 hours. The partially dehydrated peach halves were then cut into quarters and placed on a vacuum drying tray, together with an amount of corn syrup sufficient to provide a syrup layer about ¼ inch in depth. The peach quarters were arranged as a single layer. The trays were placed in a vacuum dehydrator, on shelves heated to a temperature of about 170° F. The vacuum within the dehydrator was rapidly increased over a period of about 10 minutes to a value corresponding to 28 inches mercury column, and kept at this value for the remainder of the dehydrating period. The entire vacuum dehydration period was about 10 hours. Upon removing the trays from the vacuum dehydrator, at the end of the dehydration period, the corn sugar solids were in the form of a solid porous sponge-like medium, extending between the peaches and the bottom of the tray, and enveloping and contacting the side surfaces of the peaches. The dried peaches had a moisture content of about 5%. The peaches, together with the solidified corn sugar solids, were removed from the trays, and subjected to tumbling to disintegrate about 50% of the sugar. Thereafter the disintegrated sugar was removed from the peaches by screening.

The final dehydrated product was of excellent quality, without metal contact burned areas, and with a natural color and flavor. The volume was substantially the same as after preliminary drying. It was porous and readily hydrated upon soaking in water.

*Example 2*

Fresh peaches were cut into halves, pitted and peeled. They were then subjected to preliminary drying in the same manner as described in the above Example 1. After removing the partially dried peaches, they were frozen to a temperature of 20° F., for storage. Thereafter the frozen peaches were subjected to mechanical cracking, to produce chunks or pieces averaging generally about ½ inch square. These pieces were processed in the same manner as described in the above Example 1. In general, the final dehydrated product was substantially the same as obtained in Example 1.

*Example 3*

The procedures described in the above Examples 1 and 2 were repeated, but with use of a syrup medium consisting of commercial corn syrup containing 5% sodium caseinate (dry solids basis). The added casein content served to stabilize the extent of expansion of the medium and its solidification. It also serves to provide a more uniform and finer cell structure.

*Example 4*

Examples 1 and 2 were repeated, but with use of a divided solid material as an expandable medium, in place of a fluid syrup. Particularly commercial sugar corn syrup was concentrated by evaporation to 92% solids content, and while the concentrated syrup was at a temperature level of about 140° F., sodium caseinate was added. The resulting syrup contained 95% reducing sugar and 5% casein (dry solids basis). This material was then formed into sheets, after which the sheets were chilled to below 60° F., to form a hard brittle mass. The brittle material was subjected to cracking to produce a divided material, the bulk of the fragments of which were of such size as to pass through a No. 4 mesh screen. A quantity of this divided material was placed upon drying trays, to form a layer about ⅜ inch deep, and pieces of partially dehydrated peaches, prdouced in accordance with Example 1, were distributed upon top of the layer of divided material. The trays were then subjected to vacuum dehydration in the same manner as described in Example 1. The divided material fused and expanded to form a porous solidified medium surrounding the side surfaces of the peaches, and serving to sustain the peaches out of contact with the bottom of the tray and to retain their natural cup-like contour. In general, this example produced dehydrated peaches having the characteristics described in connection with Example 1. Observation of this procedure showed that during drying no flat wet areas were formed on the bottom surfaces of the peach pieces during dehydration, as with conventional methods where the pieces rest directly on the bottom of the pan. Also the peaches did not dry hard to the pan by virtue of exuding juices, due to the formation of an intervening layer of expanded medium.

*Example 5*

The same procedure was followed as in Example 3. However, in addition to adding sodium caseinate to the corn syrup, about 3% (dry solids basis) of dried egg white was provided as a whipping agent. The syrup was agitated to incorporate air, before introducing it into the trays. This medium provided a greater extent of expansion before solidification.

*Example 6*

Dehydrated products were obtained in accordance with the foregoing examples. They were subjected momentarily to hot water vapor at about 140° F. to liquefy surface corn sugar, after which the pieces were dusted with starch, and subjected to secondary drying with agitation to remove surface moisture. This serves to reduce surface stickiness, to enhance the appearance of the final product, and to provide a free flowing bulk material.

*Example 7*

Commercial glucose syrup was introduced into a vacuum evaporating kettle. Sodium caseinate was added whereby on a dry solids basis the medium contained 95% sugar and 5% casein. The syrup was concentrated to 92% solids by vacuum evaporation. The concentrate was removed from the vacuum kettle and sheeted. Starch was applied to reduce surface stickiness. The sheets, measuring about ¼ inch thick were chilled to a product temperature of 40° F., to form a hard brittle mass. The brittle sheets were then comminuted by mechanical disintegration to form a granular divided material with a particle size of about ⅜ inch mesh. The divided material was deposited on drier trays to a depth of about ⅜ inch. Frozen pieces of partially dehydrated peaches produced in accordance with Example 2 were distributed upon the layer of frozen powder. The trays were then subjected to vacuum dehydration as in Example 1. The final dehydrated product had substantially the same characteristics as previously described.

*Example 8*

A divided medium was prepared as described in Example 7. Fresh shelled peas were subjected to conventional blanching to inhibit enzymatic activity. Excess surface moisture was removed by applying air currents and the peas scarfed and predried to about 40% moisture by conventional air drying. The divided material was introduced into dryer trays to form a layer about ⅜ inch thick. The blanched and partially dried peas were introduced into the trays upon top of the divided medium, to a depth ranging from about ¾ to 1½ inches. These trays were introduced into a vacuum dehydrator, for a vacuum concentrating operation extending over a period of 8 hours. The shelves of the dehydrator were heated to 170° F. In the first 10 minutes, the pressure within the dehydrator was decreased to about 28 inches mercury column, and thereafter the subatmospheric pressure was maintained at this value. At the end of the dehydrating step, the trays were removed from the dryer and the contents, consisting of peas imbedded in the expanded medium. Furthermore, the peas had been reoriented in the expanded medium and were generally not in direct contact with each other, or in contract with the bottom of the tray.

The sheets of material were subjected to tumbling to break up some of the sugar, after which the peas were separated from the disintegrated sugar by screening.

The dehydrated peas obtained by the foregoing Example 8 contained about 5% moisture, and were of excellent quality. The natural green color of the peas was retained, and there was no noticeable collapsing of the peas. In other words, they had substantially the same volume as the peas before dehydration. Good color and other desirable properties associated with excellent quality were retained in storage. The surfaces revealed no discolored spots or other evidence of localized overheating. Such peas readily hydrated in water, and when cooked were of excellent flavor. Conventional scarfing of the peas was found to facilitate predrying and moisture removal in the vacuum dehydrator.

*Example 9*

Peas were dehydrated by application of the method as described in Example 8. After removal of sugar by tumbling and screening, the peas while being agitated were subjected momentarily to an atmosphere of hot water vapor at about 140° F. and the press agitated during such treatment whereby remaining surface sugar was melted to provide a glazed protective surface.

*Example 10*

Fresh beef meat was ground and then boiled in one-half its weight of water. Boiling served to cook the meat and to extract and dilute the fat and water soluble juice and flavor constituents. Before cooling, the liquid fraction was removed from the cooked meat by decantation. The liquid fraction contained the major portion of the fat, juice and flavor constituents. This liquid fraction was treated by centrifuging to remove the fat from the aqueous fraction, which was returned to the meat. The cooked meat (with the aqueous fraction), which had a moisture content of about 85%, was treated in a conventional atmospheric dryer to reduce its moisture content to about 50%. An expandable divided medium was prepared as described in Example 7. This medium was introduced into vacuum dryer trays to form layers of about ⅜ inch in depth. The fragments of cooked and partially dried meat were distributed on the layer of divided medium, to provide an overlying layer having a depth of about ½ inch. These trays were placed in a vacuum dehydrator for a dry vacuum dehydrating operation, carried out substantially as described in connection with Example 1.

Use of various products incorporating my invention may provide novel consumer products. This is exemplified by peach cobbler made by use of a product made in accordance with Example 1. When conventional dehydrated or dried peaches are used with a typical pie filling mix, the peaches together with any overlying crust, sink into the filling. During baking, the immersed crust tends to disintegrate in the filling. In contrast, when peaches are used as produced by Example 1, without preliminary rehydration, they are buoyant and serve to support any overlying crust in a position above the filler. Thus, during baking, the crust remains intact and is on top of the peaches and the filler in the final baked pie. Rehydration of the peaches proceeds during baking, and the peaches do not tend to sink until the upper crust is set and firm.

I claim:
1. In a method for dehydrating a moisture-containing food product in the form of separately identifiable masses each having a definable form and exterior surface and area, the steps of causing the individual masses of the product to be carried on a supporting surface together and with their outer surfaces in contact with an expandable medium, the medium having reducing sugar as its major ingredient, and then subjecting the masses and the medium to elevated temperature of the order of 120 to 180° F. and to a sub-atmospheric pressure of the order of 22 to 28 inches mercury column to effect expansion and solidification of the medium, to effect increased areas of contact with the exterior surfaces of the masses and to effect concomitant evaporation of moisture from the masses, the masses remaining separately identifiable as such throughout the method.

2. A method as in claim 1 in which the medium initially has a moisture content that is less than the initial moisture content of the food product.

3. A method as in claim 1 in which the medium initially is in fluid form.

4. A method as in claim 1 in which the medium initially is in the form of a divided solid material.

5. A method as in claim 1 in which the medium initially incorporates air.

6. A method as in claim 1 in which, after such dehydration, the solidified medium is mechanically disintegrated and removed from the masses.

7. In a method for dehydrating a moisture-containing food product in the form of separately identifiable masses each having a definable form and exterior surface and area, causing the individual masses of the product to be carried on a supporting surface together and in contact with an expandable medium, the medium having reducing sugar as its major ingredient, heating the product and the medium to an elevated temperature of the order of from 120 to 180° F., simultaneously subjecting the product and the medium to a partial vacuum of the order of 22 to 28 inches mercury column whereby under such temperature and vacuum conditions moisture is evaporated from the product, said temperature and partial vacuum also serving to expand the medium to cause the same to substantially envelop the masses and to solidify, evaporation of moisture from the individual masses occurring to a substantial extent from the surface of the individual masses into said medium.

8. In a method for dehydrating a moisture-containing food product in the form of separately identifiable masses each having a definable form and exterior surface and area, chilling a concentrated syrup having reducing sugar as its major ingredient whereby the syrup is solidified as a brittle mass, comminuting the brittle mass to form a divided solid material, placing a quantity of the divided material upon a supporting surface together with masses of a moist food product to be dehydrated, and then subjecting the divided material and the food product to an elevated temperature of the order of 120 to 180° F and subatmospheric pressure conditions of the order of 22 to 28 inches mercury column to effect expansion of the medium with increased area of contact with the exterior surfaces of the individual masses and to effect concomitant evaporation of moisture from the masses.

9. A method as in claim 8 in which the concentrated syrup contains a minor percentage of a stabilizer to aid in controlling expansion and setting.

10. A method as in claim 7 in which the medium initially is in fluid form.

11. A method as in claim 7 in which the medium initially is in the form of a divided solid material.

12. A method as in claim 7 in which the medium contains a stabilizer together with a reducing sugar.

References Cited in the file of this patent

UNITED STATES PATENTS

| | | |
|---|---|---|
| 1,890,475 | Todd | Dec. 13, 1932 |
| 2,328,554 | Heyman | Sept. 7, 1943 |
| 2,473,184 | Webb | June 14, 1949 |